United States Patent
Iida

(10) Patent No.: US 8,457,551 B2
(45) Date of Patent: Jun. 4, 2013

(54) COMMUNICATION DEVICE, COMMUNICATION SYSTEM, AND COMMUNICATION METHOD

(75) Inventor: Sachio Iida, Chiba (JP)

(73) Assignee: Sony Corporation, Tokyo (JP)

( * ) Notice: Subject to any disclaimer, the term of this patent is extended or adjusted under 35 U.S.C. 154(b) by 169 days.

(21) Appl. No.: 13/176,159

(22) Filed: Jul. 5, 2011

(65) Prior Publication Data
US 2012/0009870 A1    Jan. 12, 2012

(30) Foreign Application Priority Data

Jul. 12, 2010 (JP) ................. 2010-157804

(51) Int. Cl.
*H04B 5/00* (2006.01)
*H04B 7/00* (2006.01)
*H04B 1/26* (2006.01)
*H04B 1/02* (2006.01)
*H04B 1/16* (2006.01)

(52) U.S. Cl.
USPC ........... 455/41.1; 455/41.2; 455/319; 455/91; 455/339

(58) Field of Classification Search
USPC .......................... 455/41.1, 41.2, 319, 91, 339
See application file for complete search history.

(56) References Cited

U.S. PATENT DOCUMENTS

| | | | |
|---|---|---|---|
| 6,424,820 B1 * | 7/2002 | Burdick et al. | 455/41.1 |
| 7,139,538 B2 * | 11/2006 | Ono et al. | 455/127.1 |
| 7,471,962 B2 * | 12/2008 | Kemmochi et al. | 455/552.1 |
| 7,652,548 B2 * | 1/2010 | Yoshikawa et al. | 333/204 |
| 8,334,728 B2 * | 12/2012 | Washiro | 333/24 R |
| 2008/0117117 A1 * | 5/2008 | Washiro | 343/850 |
| 2008/0119135 A1 * | 5/2008 | Washiro | 455/41.1 |
| 2010/0048132 A1 * | 2/2010 | Sugisaki et al. | 455/41.3 |

FOREIGN PATENT DOCUMENTS

JP    4345849    7/2009

* cited by examiner

*Primary Examiner* — Andrew Wendell
*Assistant Examiner* — Maryam Soltanzadeh
(74) *Attorney, Agent, or Firm* — Wolf, Greenfield & Sacks, P.C.

(57) ABSTRACT

There is provided a communication device including: a high frequency coupler; a band-pass filter; a switching mechanism that switches an electrical length a transmission line between the high frequency coupler and the band-pass filter; a communication unit that receives hardware information of other end of communication before establishing a communication connection; and a control unit that controls switching of the electrical length of the transmission line according to the received hardware information of the other end of communication by using the switching mechanism with or after establishing a communication connection.

11 Claims, 11 Drawing Sheets

| NECESSITY OF SWITCHING | TYPE OF INITIATOR | TYPE OF RESPONDER |
|---|---|---|
| UNAVAILABLE | TYPE A | TYPE A |
| UNNECESSARY | TYPE A | TYPE B |
| UNNECESSARY | TYPE B | TYPE A |
| NECESSARY | TYPE B | TYPE B |

| NECESSITY OF SWITCHING | TYPE OF INITIATOR | TYPE OF RESPONDER |
|---|---|---|
| NECESSARY | TYPE B | TYPE B |
| NECESSARY | TYPE B | TYPE C |
| NECESSARY | TYPE C | TYPE B |
| UNAVAILABLE | TYPE C | TYPE C |

COMMUNICATION DEVICE, COMMUNICATION SYSTEM, AND COMMUNICATION METHOD

BACKGROUND

The present disclosure relates to a communication device, a communication system and a communication method, and, particularly, to a communication device, a communication system and a communication method capable of wireless communication in close proximity.

When transferring data between small information devices, a method of communicating data through interconnection between information devices by use of a general-purpose cable such as a USB cable or a method of transferring data via a medium such as a memory card is generally adopted.

In recent years, cases of using a wireless interface, in place of such methods, have been on the increase. Concurrently, information devices incorporating various cable-less communication functions are provided. As a method of performing data communication in a cable-less manner between small information devices, radio frequency communication that transmits and receives radio signals using antennas, including wireless LAN typified by IEEE802.11 and Bluetooth (registered trademark) communication, is developed. The radio frequency communication eliminates the need to insert and withdraw a connector and route a cable at each data communication when exchanging data such as images or music, thus offering enhanced user-friendliness.

Further, a close proximity wireless communication system that uses a high frequency coupler rather than an antenna and achieves wireless communication in a short distance of several centimeters utilizing electric field coupling by an electrostatic field or an induction field has been proposed (cf. e.g. Japanese Patent No. 4345849). In the close proximity wireless communication system, a communication distance is as short as several centimeters to prevent crosstalk with wireless LAN, Bluetooth (registered trademark) communication or the like. Therefore, the close proximity wireless communication system enables broadband communication without interference with another communication system. Further, the close proximity wireless communication system enables high-speed data transfer, thus allowing transfer of high-volume data in a short time, such as transfer of digital camera images or transfer of digital video camera high-definition pictures.

SUMMARY

Because the high frequency coupler utilizes electric field coupling by an electrostatic field or an induction field, if the high frequency coupler to be coupled with is located within a short distance of about 5 millimeters, VSWR (Voltage Standing Wave Ratio) is a small value of 2 or less, and impedance matching is obtained. At this time, it is considered that the two high frequency couplers on the transmitting side and the receiving side are coupled by a quasi-electrostatic field.

On the other hand, when the high frequency couplers are located at a distance of 10 millimeters or more, VSWR is a relatively large value, and impedance mismatching occurs. At this time, it is considered that the two high frequency couplers are coupled by an induction field.

FIG. 4 shows a result of calculating a transfer characteristic from the point 1 to the point 6 in FIG. 1 by numerical simulation when directly connecting a band-pass filter and a high frequency coupler (the electrical length of a transmission line is 0 degree). The curve A indicates an ideal transfer characteristic when impedance matching is obtained. On the other hand, the curve B indicates an actual transfer characteristic when a band-pass filter and a high frequency coupler are directly connected, showing that a large ripple of about 2.5 dB measured as a peak to peak value (=C1+C2) is occurring due to impedance mismatching. Thus, when the electrical length of a transmission line of a transmitter and the electrical length of a transmission line of a receiver are substantially equal, a large ripple occurs, an error occurs in data due to a distortion of frequency characteristics, and, consequently, a data transmission speed decreases.

In light of the foregoing, it is desirable to provide novel and improved communication device, communication system and communication method capable of suppressing a ripple in transfer characteristics and preventing a decrease in data transmission speed and thereby providing good broadband characteristics even when both of communication devices have the same type of hardware configuration.

According to an embodiment of the present disclosure, there is provided a communication device which includes a high frequency coupler;

a band-pass filter;

a switching mechanism that switches an electrical length of a transmission line between the high frequency coupler and the band-pass filter;

a communication unit that receives hardware information of other end of communication before establishing a communication connection; and a control unit that controls switching of the electrical length of the transmission line according to the received hardware information of the other end of communication by using the switching mechanism with or after establishing a communication connection.

According to another embodiment of the present disclosure, there is provided a communication system which to perform data transmission between two communication devices each including a high frequency coupler and a band-pass filter, at least one communication device of the two communication devices includes a switching mechanism that switches an electrical length of a transmission line between the high frequency coupler and the band-pass filter;

a communication unit that receives hardware information of other communication device before establishing a communication connection; and a control unit that controls switching of the electrical length of the transmission line according to the received hardware information of the other communication device by using the switching mechanism with or after establishing a communication connection.

According to another embodiment of the present disclosure, there is provided a communication method of a communication device including a high frequency coupler and a band-pass filter includes receiving hardware information of other end of communication before establishing a communication connection; and controlling switching of an electrical length of a transmission line between the high frequency coupler and the band-pass filter according to the received hardware information of the other end of communication, by using a switching mechanism that switches the electrical length of the transmission line between the high frequency coupler and the band-pass filter, with or after establishing a communication connection.

According to the embodiments of the present disclosure described above, it is possible to suppress a ripple and prevent a decrease in data transmission speed and thereby provide good broadband characteristics even when both of communication devices have the same type of hardware configuration.

DETAILED DESCRIPTION OF THE EMBODIMENT(S)

Figure 1:
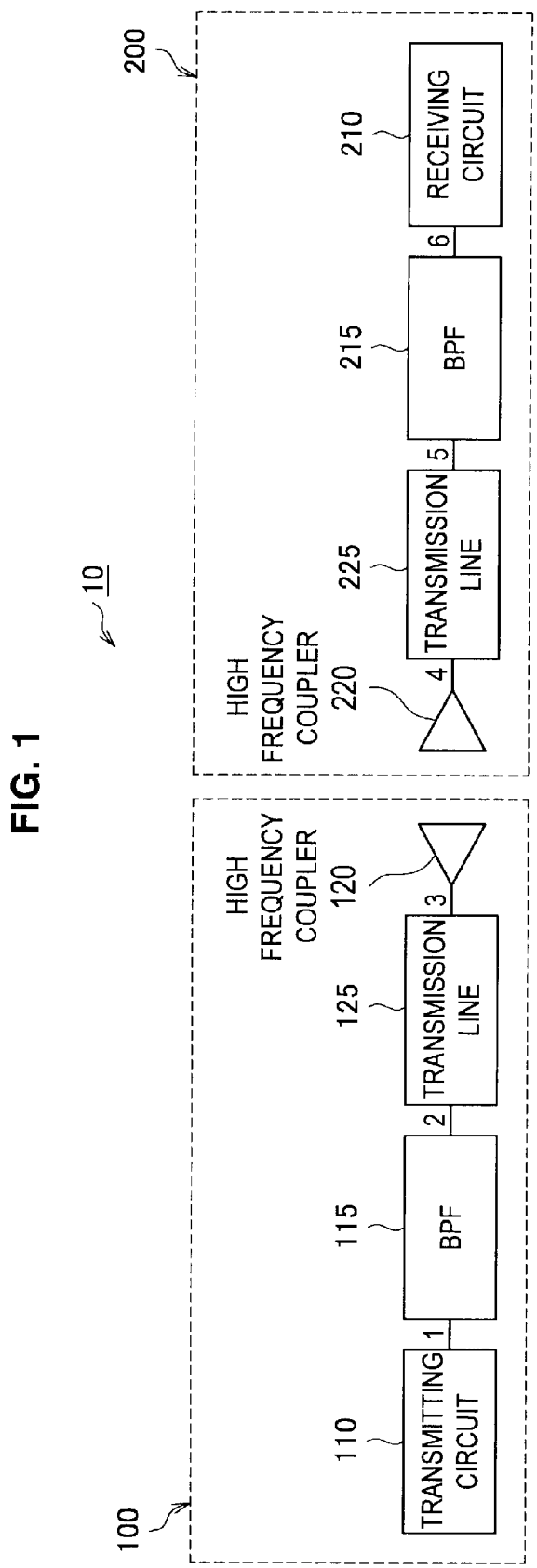
FIG. 1 is an overall block diagram of a close proximity wireless communication system according to a first embodiment of the disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the disclosure will be described hereinafter in the following order.
 <First Embodiment>
 [Overall Configuration of Close Proximity Wireless Communication System]
 [Transfer Characteristic]
 [Relationship between Electrical Lengths of Two Communication Devices and Ripple]
 [Sequence to Establish Connection of Close Proximity Wireless Communication]
 [Internal Configuration of Communication Device]
 [Necessity to Switch Transmission Line]
 [Process of Switching Transmission Line]
 <Second Embodiment>
 [Internal Configuration of Communication Device]
 [Necessity to Switch Transmission Line]
 [Process of Switching Transmission Line]
 <Third Embodiment>
 [Process of Switching Transmission Line]

In a close proximity wireless communication system using a high frequency coupler, a device may be equipped with a band-pass filter in order to avoid interference from another communication system in cases where another communication system such as wireless LAN is mounted in the same housing. In each embodiment described hereinbelow, one of devices that perform close proximity wireless communication switches an electrical length between a high frequency coupler and a band-pass filter of its own device so that it is different from an electrical length of the other device in an authentication process after establishing a connection. It is thereby possible to provide a close proximity wireless communication system capable of performing favorable communication without degrading a frequency characteristic of a band-pass filter even with an impedance mismatch of high frequency couplers.

First Embodiment

[Overall Configuration of Close Proximity Wireless Communication System]

The configuration and transfer characteristic of a close proximity wireless communication system according to a first embodiment of the disclosure are described firstly with reference to the drawings. FIG. 1 shows an overall configuration of a close proximity wireless communication system 10 according to the first embodiment. A transmitter 100 includes a transmitting circuit 110, a BPF 115 (transmitting-side band-pass filter), a high frequency coupler 120 (transmitting-side coupler), and a transmission line 125. A receiver 200 includes a receiving circuit 210, a BPF 215 (receiving-side band-pass filter), a high frequency coupler 220 (receiving-side coupler), and a transmission line 225. The transmitter 100 and the receiver 200 have the same configuration, and the same component is used for the BPF 115 and the BPF 215, and the high frequency coupler 120 and the high frequency coupler 220, respectively.

The transmission line 125 is a line that connects between the band-pass filter 115 and the high frequency coupler 120. Likewise, the transmission line 225 is a line that connects between the band-pass filter 215 and the high frequency coupler 220. For example, the transmission lines 125 and 225 may be microstrip lines with a characteristic impedance of 50Ω formed on a printed board. Further, the transmission lines 125 and 225 may be coaxial cables, or transmission lines formed as a part of the high frequency couplers 120 and 220.

The transmitter 100 and the receiver 200 may function as a receiver and a transmitter, respectively, depending on occasion by two-way communication. Specifically, although the transmitter 100 transmits data and the receiver 200 receives data at the present moment, when transmitting and receiving ends of data become reversed, the receiver 200 acts as a transmitter, and the transmitter 100 acts as a receiver.

Therefore, the transmitting circuit 110 and the receiving circuit 210 are communication circuits that function both as a transmitting circuit and a receiving circuit and process high-frequency signals for transmitting data, which correspond to communication units. Further, the transmitter 100 and the receiver 200 correspond to communication devices that include a communication unit, a band-pass filter and a high frequency coupler. The close proximity wireless communication system 10 corresponds to a communication system that includes two communication devices capable of data transmission using close proximity wireless communication technology.

It should be noted that the "system" as referred to herein indicates a logical set of a plurality of devices (or functional modules that implement characteristic functions), and each device or functional module may or may not be within a single housing.

[Transfer Characteristic]

Figure 2:
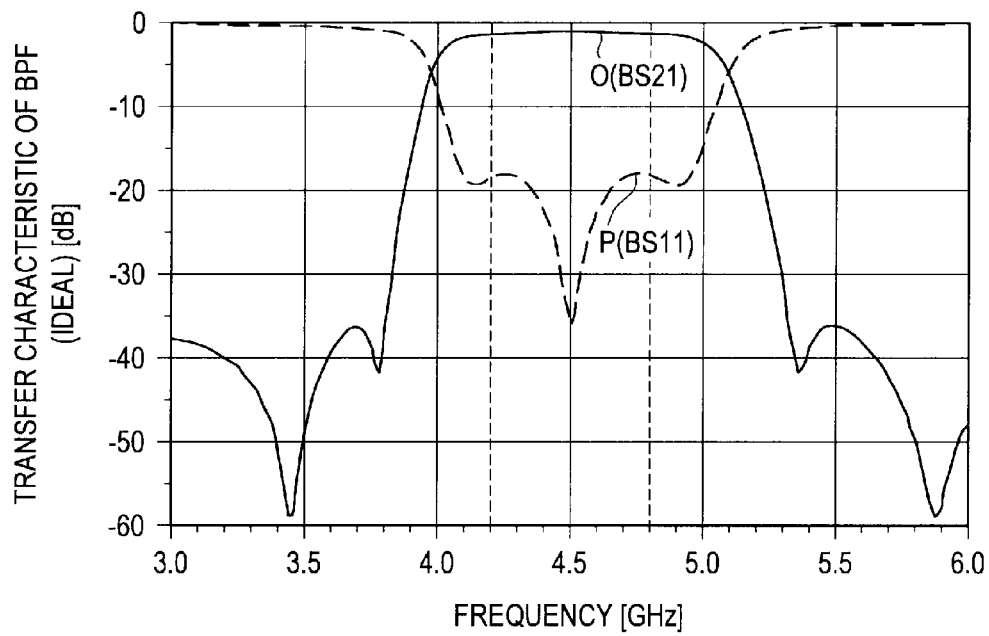
FIG. 2 is a graph showing a transfer characteristic of an ideal fifth order band-pass filter.

Referring to FIG. 2, the passband of the band-pass filters (BPFs 115 and 215) is in the range of 4.2 GHz to 4.8 GHz, and the close proximity wireless communication system performs communication by using the whole band. The curve O indicates a transfer characteristic, which exhibits a flat frequency characteristic in the band of 4.2 GHz to 4.8 GHz. The curve P indicates a reflection characteristic, which exhibits a small reflection coefficient in the band.

Figure 3:
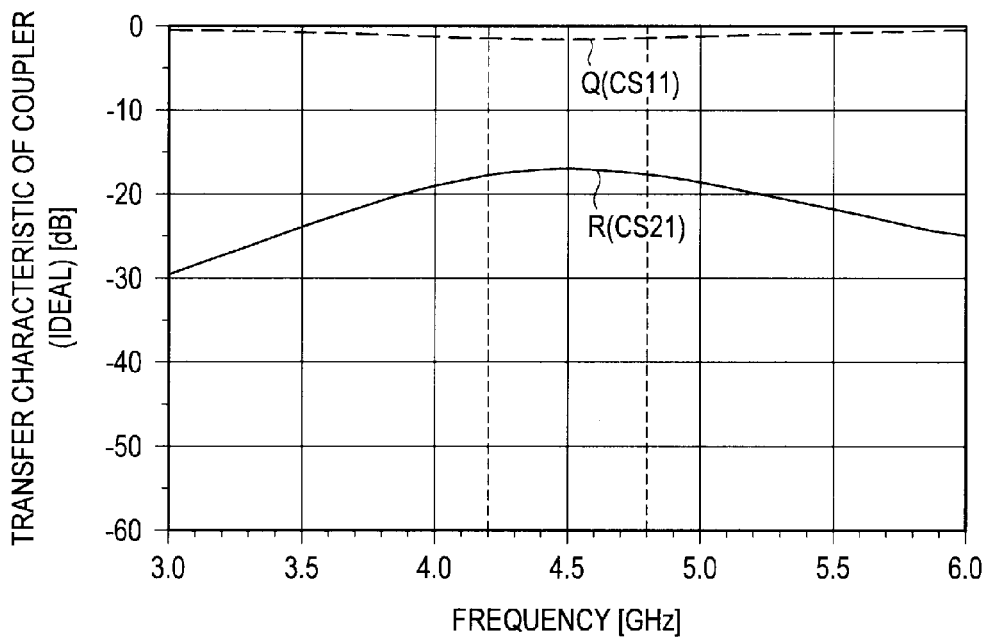
FIG. 3 is a graph showing a transfer characteristic in the case of simulation using an ideal coupler.

FIG. 3 shows a transfer characteristic and a reflection characteristic in the state where a pair of high frequency couplers 120 and 220 between the point 3 and the point 4 in FIG. 1 are coupled at a distance of about 20 mm from each other. While the transfer characteristic indicated by the curve R exhibits a frequency characteristic in which the degree of coupling is high centering on the passband of 4.2 GHz to 4.8 GHz, the reflection characteristic indicated by the curve Q exhibits a large reflection coefficient inside and outside the passband. Thus, VSWR is large, and impedance mismatching is occurring.

Figure 4:
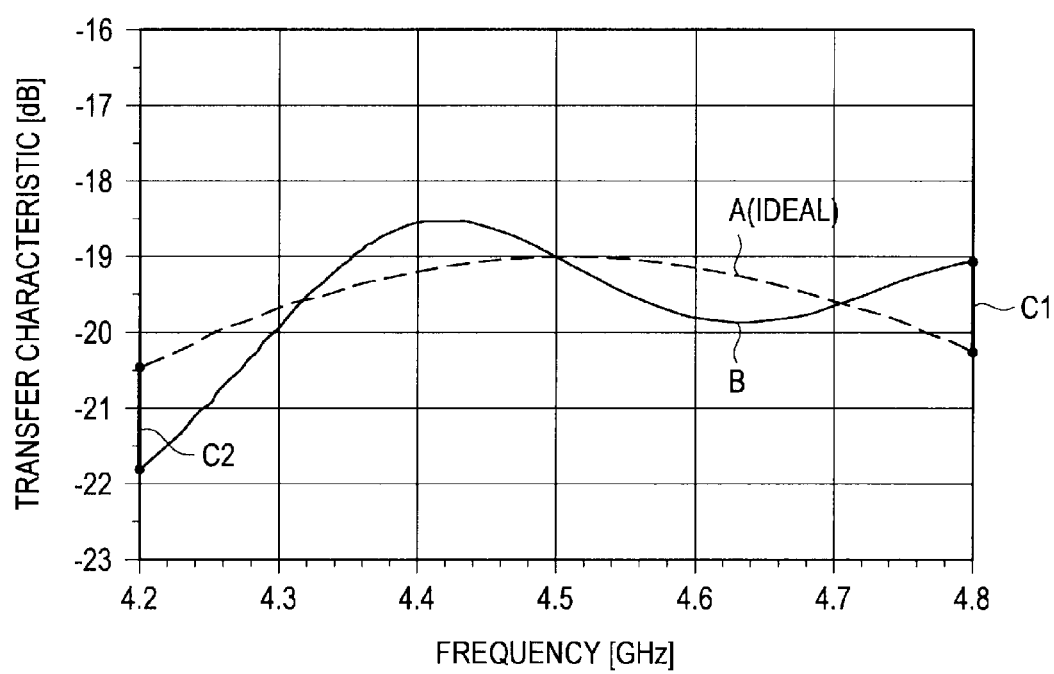
FIG. 4 is a view showing a relationship between electrical lengths of transmission lines of a transmitter and a receiver and a ripple.

FIG. 4 shows a result of calculating a transfer characteristic from the point 1 to the point 6 in FIG. 1 by numerical simulation when a band-pass filter and a high frequency coupler are directly connected (the electrical length of a transmission line is 0 degree). The curve A indicates an ideal transfer characteristic when impedance matching is obtained. On the other hand, the curve B indicates an actual transfer characteristic, showing that a large ripple of about 2.5 dB measured as a peak to peak value (=C1+C2) is occurring due to impedance mismatching.

[Relationship between Electrical Lengths of Two Communication Devices and Ripple]

Figure 5:
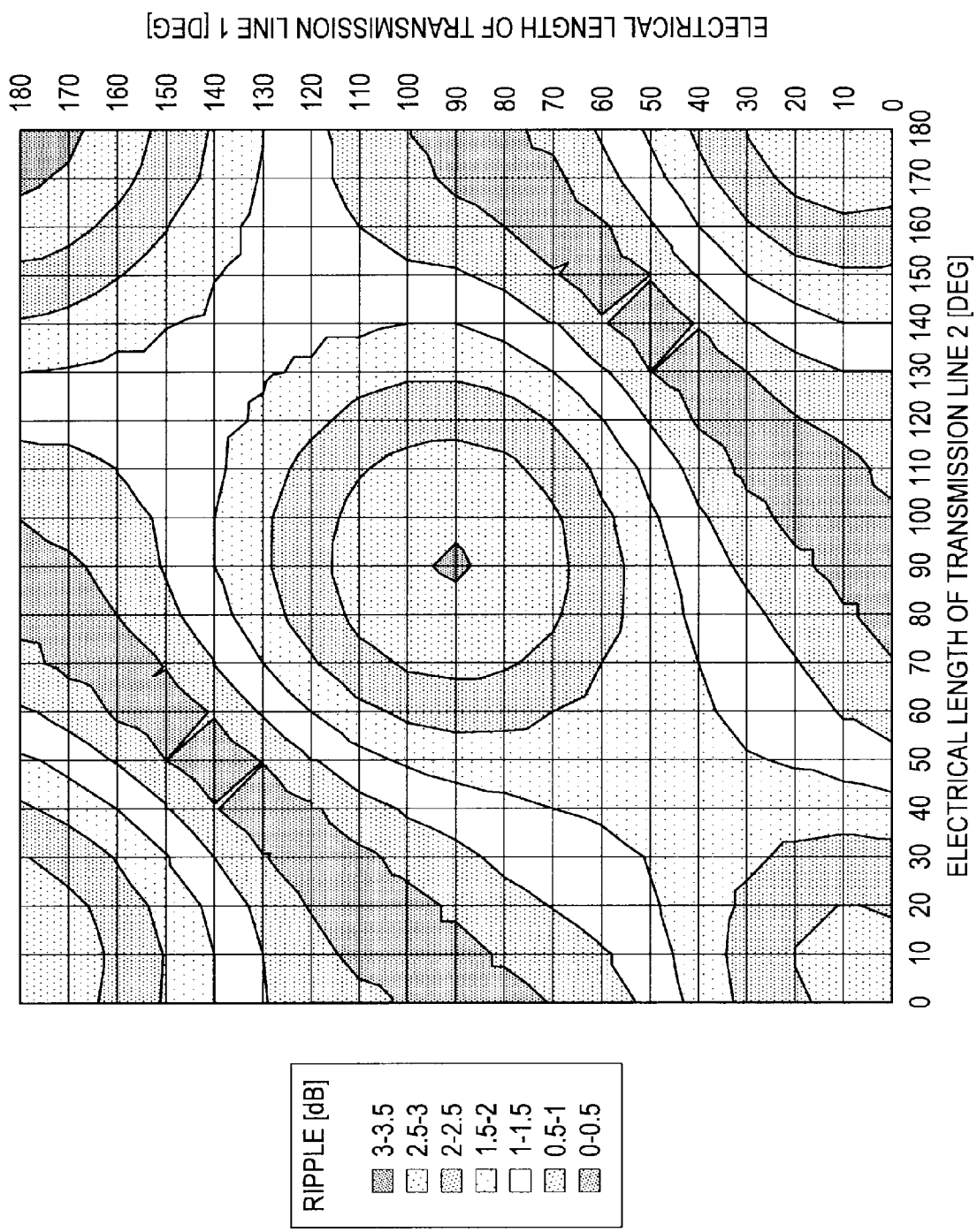
FIG. 5 is a graph comparing a transfer characteristic between the case where impedance matching is obtained and the case of the first embodiment.

In order to examine a relationship between a ripple and a transmission line, FIG. 5 shows a result of contour plotting of the size of ripples with the electrical length of a transmission line 1 of one communication device and the electrical length of a transmission line 2 of another communication device at the other end of communication varying in steps of 10 degrees from 0 to 180 degrees. In the graph of FIG. 5, the vertical axis indicates the electrical length of the transmission line 1 at 4.5 GHz, and the horizontal axis indicates the electrical length of the transmission line 2 at 4.5 GHz.

On the diagonal line from the lower left to the upper right of the graph of FIG. 5 comes the case where the electrical length of the transmission line 1 and the electrical length of the transmission line 2 are equal, and the top of the contour, which is the point at which the ripple is the largest, is on the diagonal line. The simulation result of FIG. 4 described earlier corresponds to the lower left corner of FIG. 5, in which the electrical length of the transmission line 1 and the electrical length of the transmission line 2 are equal (both 0 degree), and therefore a ripple is large.

On the other hand, the bottom of the contour at which a ripple is suppressed to 0.5 dB or less is in the region where the electrical length of the transmission line 1 and the electrical length of the transmission line 2 are different by approximately 90 degrees±20 degrees, and the bottom of the contour at which a ripple is suppressed to 1.0 dB or less is in the region where they are different by approximately 90 degrees±40 degrees.

Figure 6:
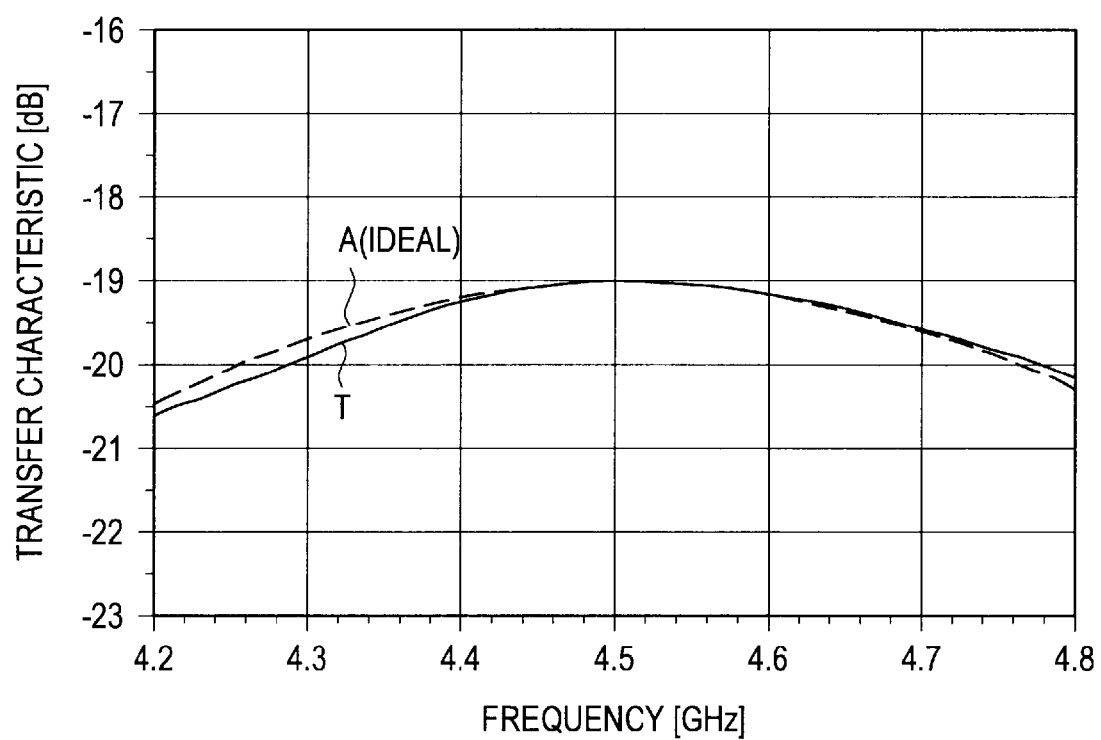
FIG. 6 is a graph showing transfer characteristics in the case where impedance matching is obtained.

FIG. 6 shows a result of numerical simulation in the same way as that of FIG. 4. when the electrical length of the transmission line 1 is 0 degree and the electrical length of the transmission line 2 is 90 degrees. The curve T that is obtained when setting the electrical lengths of the transmission lines 1 and 2 to be different by 90 degrees is in substantial agreement with the curve A indicating an ideal transfer characteristic when impedance matching is obtained, and a ripple is suppressed to 0.5 dB or less.

As described above, in the close proximity wireless communication system 10 equipped with band-pass filters, a ripple occurs in transfer characteristics due to impedance mismatching of high frequency couplers, and its amplitude is larger as the electrical lengths of the transmission lines 1 and 2 that connect the high frequency coupler and the band-pass filter of each of two devices, i.e., a transmitter and a receiver, are closer. On the other hand, when a difference of approximately 90 degrees±40 degrees is placed between the electrical lengths of the transmission lines 1 and 2, a ripple is suppressed to about 1 dB. Further, when a difference of approximately 90 degrees±20 degrees is placed between the electrical lengths of the transmission lines 1 and 2, a ripple is suppressed to about 0.5 dB.

Thus, in the case where both of communication devices have the same type of hardware configuration, it is likely that they have the same length of transmission line, which causes a ripple in transfer characteristics to be large, so that an error occurs in data due to a distortion of frequency characteristics, resulting in a decrease in data transmission speed.

In view of the above, the first embodiment described hereinbelow and the second and third embodiments described later provide a communication system capable of suppressing a ripple in transfer characteristics and preventing a decrease in data transmission speed and thereby providing good broadband characteristics even when both of communication devices are of the same model type and have the same type of hardware configuration.

[Sequence to Establish Connection of Close Proximity Wireless Communication]

Figure 7:
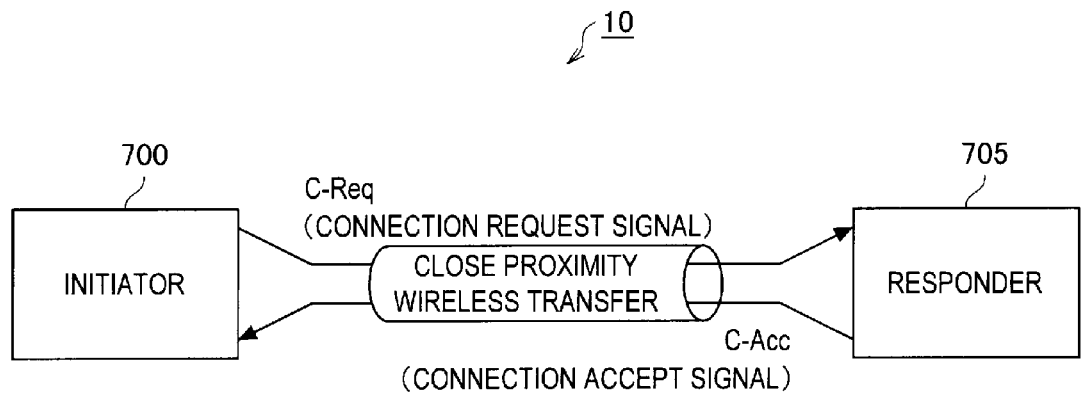
FIG. 7 is a conceptual diagram of a close proximity wireless communication system according to the first embodiment.

In the wireless communication system 10 according to the embodiment, data is transmitted and received between devices in close proximity using close proximity wireless transfer technology by a communication mode for transmitting and receiving data between a pair of devices. FIG. 7 is a view schematically showing the wireless communication system 10 according to the embodiment. Two communication devices constituting the system have roles of an initiator 700 and a responder 705. The initiator 700 is "a side that makes a request for a connection", and the responder 705 is "a side that waits for a request for a connection". In this embodiment, one-to-one (P2P) communication is performed. The devices involved in a connection have the same configuration, though they have different roles at the time of a connection.

The initiator 700 may be a variety of devices including home/office equipment such as a personal computer, a portable device, an electronic card, a digital camera, a video camera, an audio player, a printer/copier or a projector, a television, a recorder, a game machine, and an information kiosk, for example. Likewise, the responder 705 may be a variety of devices including home/office equipment such as a personal computer, a portable device, an electronic card, a digital camera, a video camera, an audio player, a printer/copier or a projector, a television, a recorder, a game machine, and an information kiosk, for example. The two communication devices constituting the system can act both as the initiator 700 and the responder 705, thus enabling direct two-way communication between devices.

Figure 8:
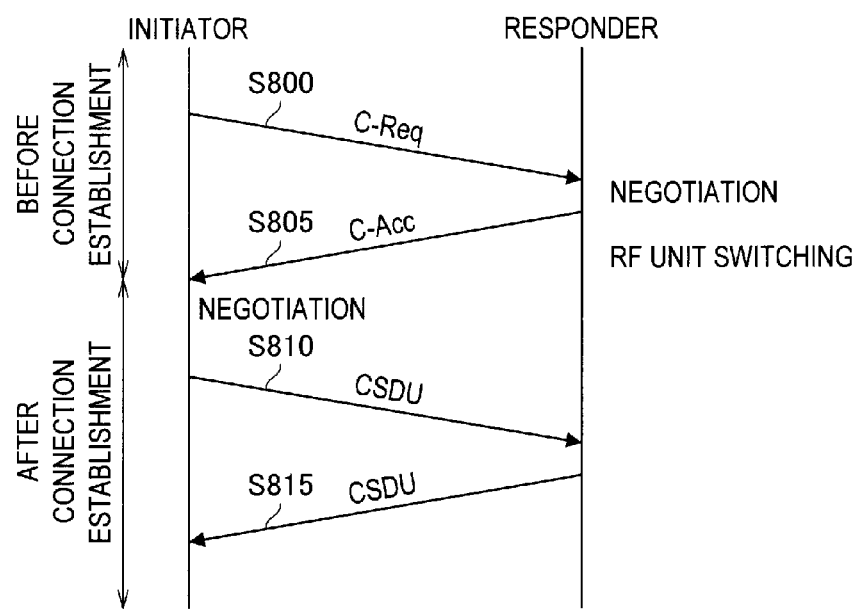
FIG. 8 is a view showing a sequence to establish a connection of close proximity wireless communication according to the first embodiment.

FIG. 8 is a view showing a sequence to establish a connection for communication between the initiator 700 and the responder 705. Prior to establishing a communication connection, when the initiator 700 and the responder 705 are placed within several centimeters from each other, the initiator 700 transits a connection request signal (C-Req: Connection Request) (step S800).

In response thereto, the responder 705 performs negotiation with the initiator 700 and, as a result, transmits a connection accept signal (C-Acc: Connection Accept) back (step S805).

Receiving the connection accept signal (C-Acc) from the responder 705, the initiator 700 performs negotiation with the responder 705. In the negotiation, version information of software and hardware or the like is checked. When, as a result of the negotiation, a version and an emulation mode match, a communication connection is established.

At least either one of the two communication devices according to the first embodiment has a mechanism of switching a transmission line between a high frequency coupler and a band-pass filter in an RF unit, as described later. Concurrently with or after the connection establishment, when it is determined that RF units (for example, wireless communication units shown in types A and B of FIG. 9) of the initiator 700 and the responder 705 are an incompatible combination, the responder 705 switches the electrical length of a transmission line in the RF unit. After the switching, data is transmitted between the initiator 700 and the responder 705.

The data transmission after the switching performed using CSDU (Connection layer Service Data Unit) packets (steps S810 and S815). After the end of the data transmission, a user separates the two devices, and a connection is disconnected.

In a communication method according to the embodiment, an error-correcting process or the like is performed using a low-rate coding mode, and hardware information or the like is transmitted to the other end of communication in the stage of communication connection establishment. On the other and, in the stage of negotiation that is performed concurrently with or after the communication connection establishment, the electrical length of the transmission line in the RF unit is switched on the responder side based on the hardware information, and then data transmission is performed using a high-rate coding mode with CSDU packets. Note that the switching of the electrical length of the transmission line may be performed on the initiator side.

[Internal Configuration of Communication Device]

Figure 9:
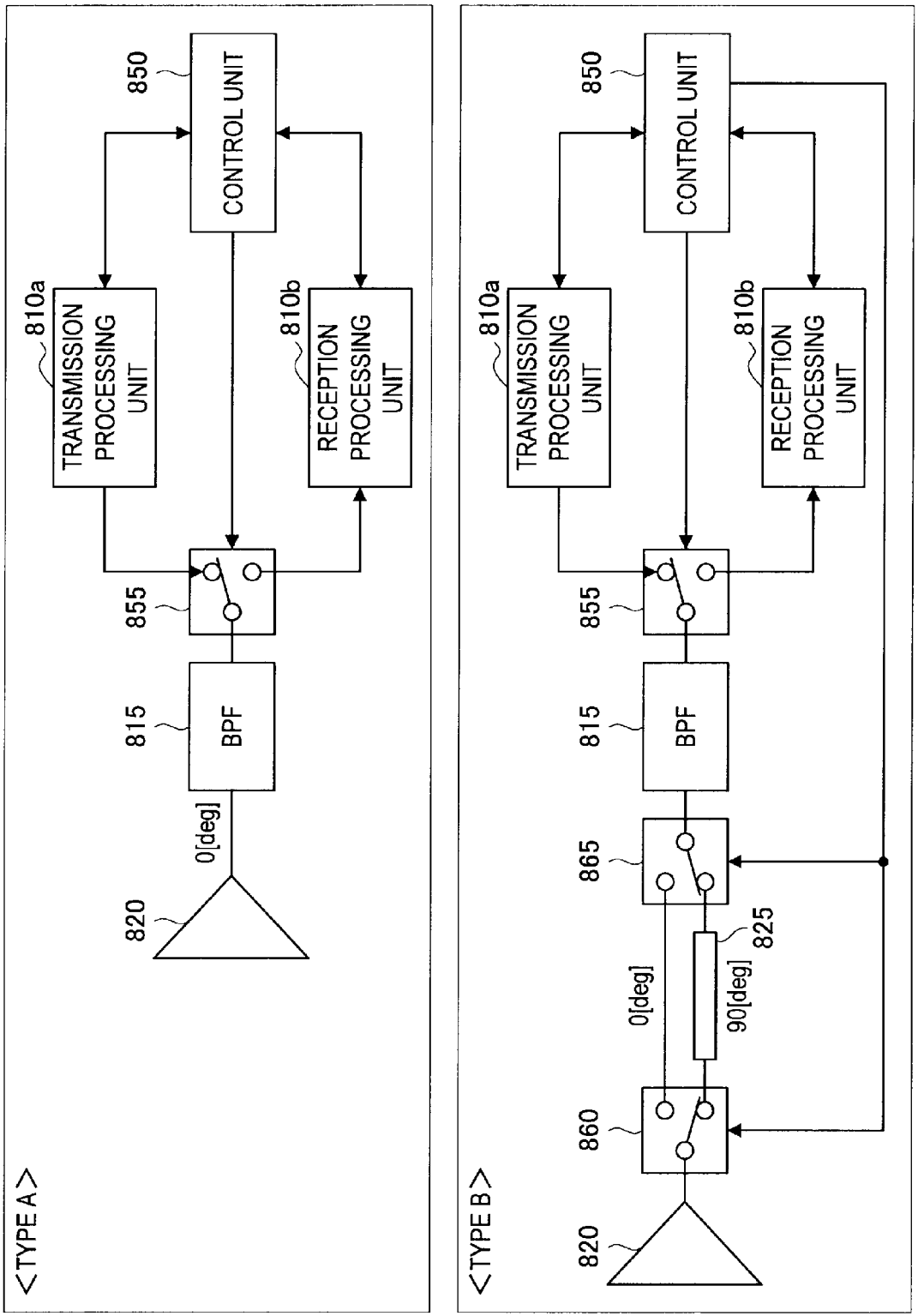
FIG. 9 is a view showing internal block diagrams (type A and type B) of a communication device according to the first embodiment.

In the system according to the embodiment, it is assumed that an RF unit of one communication device (initiator) is the type A, and an RF unit of the other communication device (responder) is the type B, both shown in FIG. 9. The communication device of the type A includes a BPF 815 (band-pass filter), a high frequency coupler 820 (coupler), a transmission processing unit 810a, a reception processing unit 810b, a control unit 850, and a switch 855. In the type A, the high frequency coupler 820 and the BPF 815 are directly connected, and there is no transmission line. Thus, the electrical length of a transmission line in the type A is 0 degree. Accordingly, there is no switching mechanism for switching a transmission line between the high frequency coupler 820 and the BPF 815. Further, in the initial state, the switch 855 of the communication device of the type A is connected to the transmission processing unit 810a.

The communication device of the type B includes a BPF 815 (band-pass filter), a high frequency coupler 820 (coupler), a transmission processing unit 810a, a reception processing unit 810b, a control unit 850, switches 855, 860 and 865, and a transmission line 825. In the type B, a path with no transmission line (the electrical length of a transmission line is 0 degree) and a path in which the high frequency coupler 820 and the BPF 815 are connected by the transmission line 825 (the electrical length of the transmission line is 90 degrees) can be switched. In the initial state of FIG. 9, the BPF 815 and the high frequency coupler 820 are connected through the transmission line 825 using the switches 860 and 865. The switches 860 and 865 are a switching mechanism. The electrical length of the transmission line 825 is thereby 90 degrees as a default value (initial state). Further, although the switch 855 in the communication device of the type B is connected to the transmission processing unit 810a in the initial state, because it is a device on the responder side in this case, the switch 855 is switched to be connected to the reception processing unit 810b before establishing a communication connection.

[Necessity to Switch Transmission Line]

Switching is necessary depending on compatibility between the two communication devices of the initiator 700 and the responder 705. The degree of compatibility of the two communication devices varies because a ripple becomes larger as the electrical lengths of the transmission lines of the two communication devices become closer as shown in FIG. 5.

Figures 10, 11:
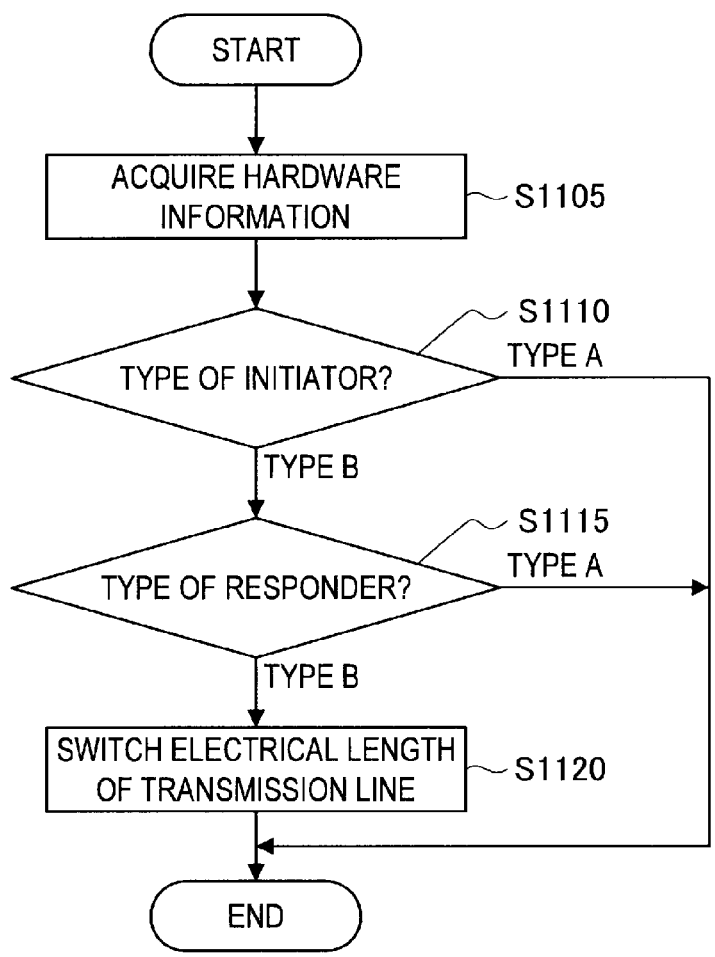
FIG. 10 is a view showing the necessity to switch a transmission line according to the first embodiment.
FIG. 11 is a flowchart showing a switching process according to the first embodiment.

FIG. 10 shows the necessity for switching in the case of performing close proximity wireless communication using at least one of the communication device of the type A with no switching mechanism and the communication device of the type B with the switching mechanism. When the model type of the initiator and the model type of the responder are both the type A, the electrical lengths of the transmission lines are the same (0 degree) and the compatibility is low; however, because the communication device of the type A does not have the switching mechanism, there is no way of switching. In this case, the switch 855 of the communication device on the initiator side remains in the same state, and the switch 855 of the communication device on the responder side is switched into connection with the reception processing unit 810b.

When the model type of the initiator is the type A and the model type of the responder is the type B, the electrical length of the transmission line of the initiator is 0 degree, and the electrical length of the transmission line of the responder is 90 degrees, and therefore the occurrence of a ripple is the lowest by referring to FIG. 5, and the compatibility is high. Thus, there is no need for switching in the communication device of the type B in this case.

When the model type of the initiator is the type B and the model type of the responder is the type A, the electrical length of the transmission line of the initiator is 90 degrees, and the electrical length of the transmission line of the responder is 0 degree, and therefore the occurrence of a ripple is the lowest by referring to FIG. 5, and the compatibility is high. Thus, in this case also, there is no need for switching in the communication device of the type B.

When the model type of the initiator and the model type of the responder are both the type B, the electrical lengths of the transmission lines are the same, and the compatibility is low. Thus, in this case, it is necessary to perform control for switching the electrical length of the transmission line to 0 degree by the switching mechanism of the communication device on the responder side. Note that the control for switching the transmission line may be made on the initiator side, rather than on the responder side.

[Process of Switching Transmission Line]

A process of switching a transmission line according to the embodiment is described hereinafter with reference to FIG. 11. Note that it is assumed in this embodiment that the following switching process is performed in the communication device on the responder side.

The communication device on the responder side receives a connection request signal from the initiator before establishing a communication connection. Further, the communication device on the responder side acquires hardware information of the initiator before establishing a communication connection (step S1105). The communication device on the responder side determines a model type of the initiator based on the hardware information (step S1110). When the model type of the initiator is the type A, the process ends immediately because there is no case of performing the switching process regardless of whether the model type of the responder is the type A or the type B (cf. FIG. 10).

On the other hand, when the model type of the initiator is the type B, and when the model type of the responder is the type A in step S1115, the process ends immediately because the switching process in the communication device on the responder side is not available.

When the model type of the responder is the type B in step S1115, the initiator and the responder are both the type B, and therefore the compatibility is low. Thus, the control unit 850 in the communication device on the responder side switches the electrical length of the transmission line on the responder side to 0 degree, and then the process ends. In this manner, according to the embodiment, even when the compatibility is low in the initial state, the electrical length of the transmission line can be switched concurrently with or after the establishment of a communication connection so as to suppress the occurrence of a ripple, and then data transmission can be performed using a high-rate coding mode.

As described above, according to the embodiment, even when both of communication devices have the same type of hardware configuration, the electrical lengths of the transmission lines of the two communication devices can be controlled to be different by switching the electrical length of the transmission line of the communication devices on the responder side. As a result, it is possible to suppress a ripple in transfer characteristics and prevent a decrease in data transmission speed and thereby provide good broadband characteristics.

Second Embodiment

[Internal Configuration of Communication Device]

Figure 12:
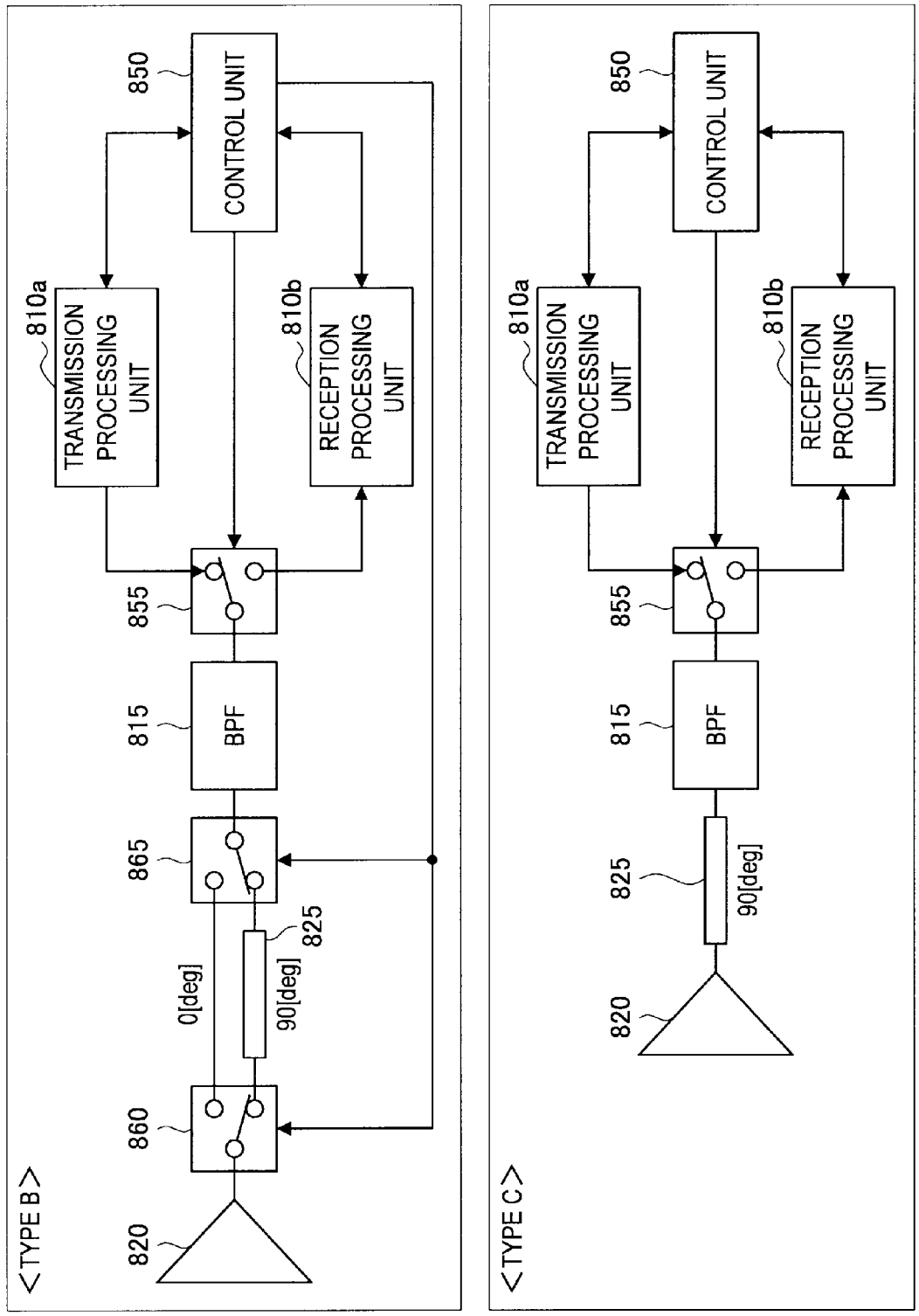
FIG. 12 is a view showing internal block diagrams (type B and type C) of a communication device according to a second embodiment of the disclosure.

In a close proximity wireless communication system according to a second embodiment of the disclosure, it is assumed that an RF unit of one communication device (initiator) is the type B, and an RF unit of the other communication device (responder) is the type C, both shown in FIG. 12.

The internal configuration of the communication device of the type B is described in the first embodiment and thus not repeatedly described. The internal configuration of the communication device of the type C includes a BPF 815 (bandpass filter), a high frequency coupler 820 (coupler), a transmission processing unit 810a, a reception processing unit 810b, a control unit 850, a switch 855, and a transmission line 825 as shown in FIG. 12. In the type C, the high frequency coupler 820 and the BPF 815 are connected by the transmission line 825, and the electrical length of the transmission line in the type C is 90 degrees. The communication device of the type C does not have the switching mechanism for switching the transmission line between the high frequency coupler 820 and the BPF 815. Further, in the initial state, the switch 855 in the communication device of the type C is connected to the transmission processing unit 810a.

On the other hand, in the type B, a path in which the high frequency coupler 820 and the BPF 815 are directly connected and there is no transmission line and a path in which the high frequency coupler 820 and the BPF 815 are connected by the transmission line 825 can be switched as described above. Thus, the electrical length of the transmission line in the type B can be switched between 0 degree and 90 degrees. In the initial state of FIG. 12, the BPF 815 and the high frequency coupler 820 are connected through the transmission line 825 using the switches 860 and 865. The electrical length of the transmission line 825 is thereby 90 degrees in the initial state. Further, in the initial state, the switch 855 in the communication device of the type B is connected to the transmission processing unit 810a.

[Necessity to Switch Transmission Line]

Switching is necessary depending on compatibility between the two communication devices. The degree of compatibility of the two communication devices varies because a ripple becomes larger as the electrical lengths of the transmission lines of the two communication devices become closer as shown in FIG. 5.

Figures 13, 14:
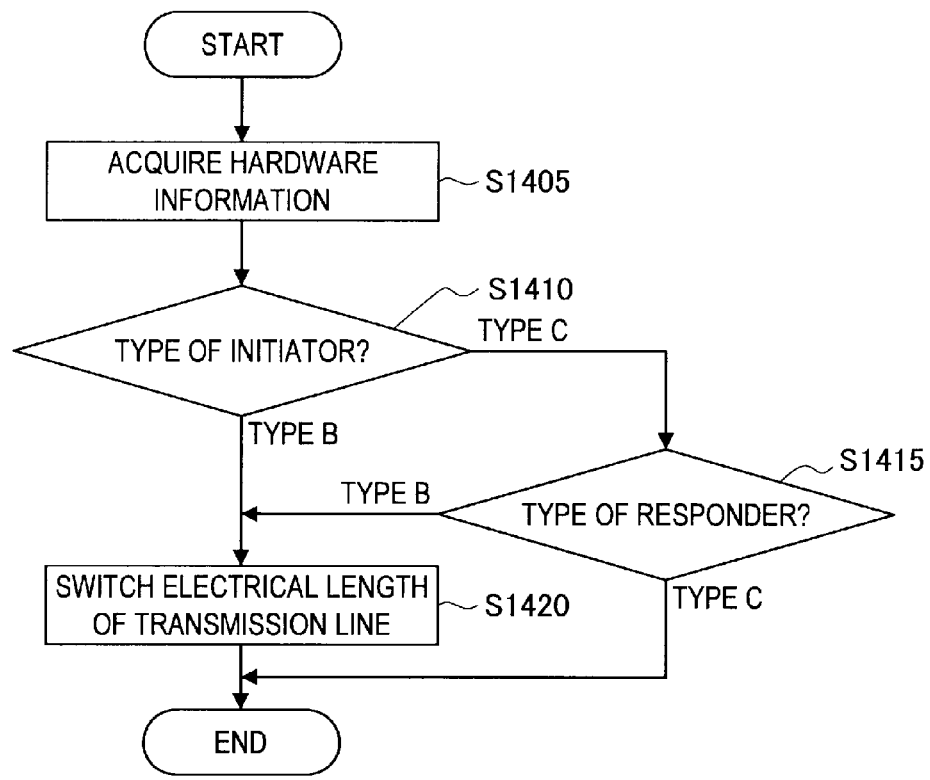
FIG. 13 is a view showing the necessity to switch a transmission line according to the second embodiment.
FIG. 14 is a flowchart showing a switching process according to the second embodiment.
Figure 15:
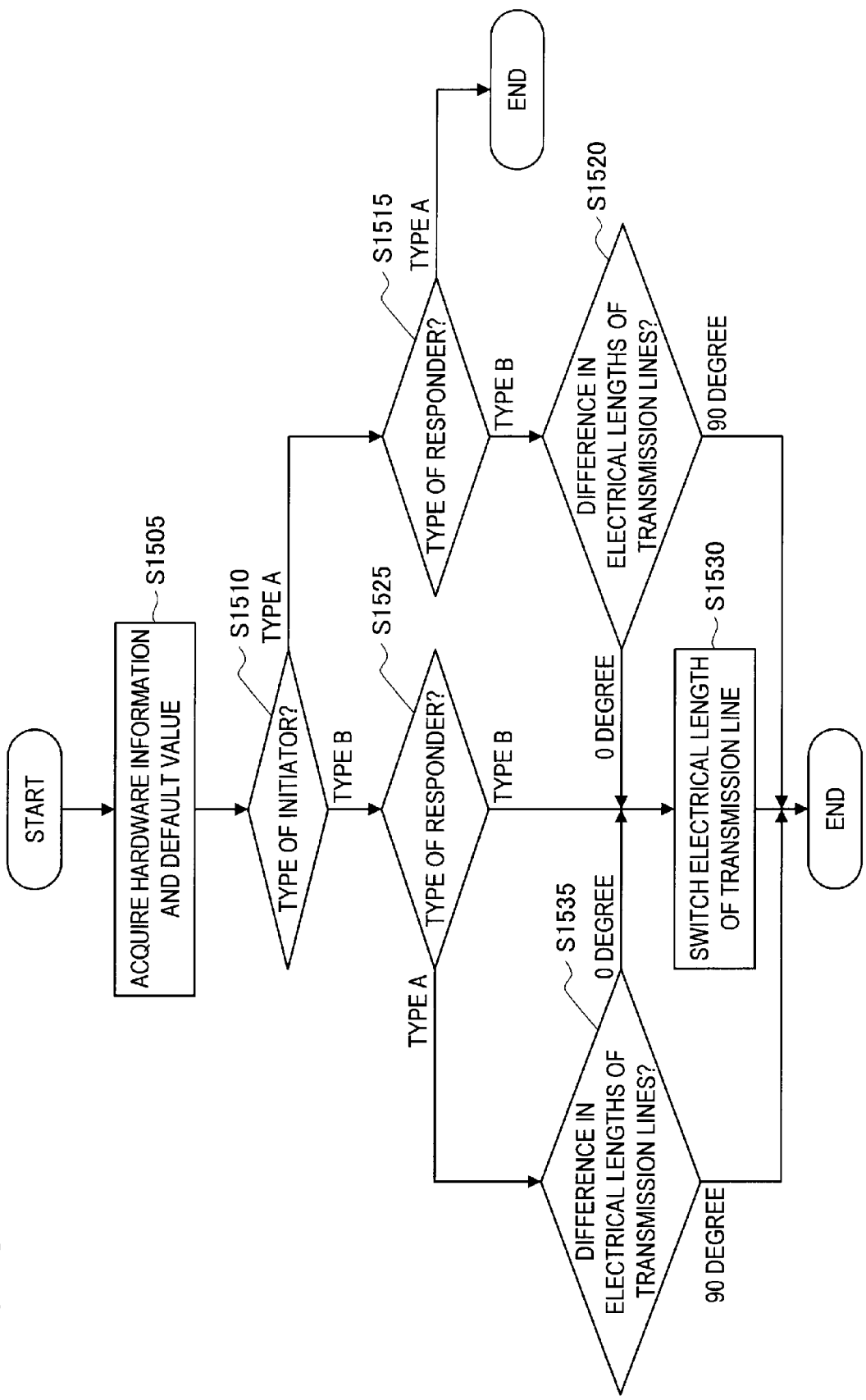
FIG. 15 is a flowchart showing a switching process according to a third embodiment of the disclosure.

FIG. 13 shows the necessity for switching in the case of performing close proximity wireless communication using at least one of the communication device of the type C with no switching mechanism and the communication device of the type B with the switching mechanism. When the model type of the initiator and the model type of the responder are both the type B, the electrical lengths of the transmission lines are the same, and the compatibility is low. Thus, in this case, it is necessary to perform control to switch the electrical length of the transmission line of the communication device either on the initiator side or on the responder side to 0 degree.

When the model type of the initiator is the type B and the model type of the responder is the type C, the electrical lengths of the transmission lines are the same, and the compatibility is low. Thus, in this case, it is necessary to perform control to switch the electrical length of the transmission line to 0 degree by the switching mechanism of the communication device on the initiator side having the switching mechanism.

When the model type of the initiator is the type C and the model type of the responder is the type B, the electrical lengths of the transmission lines are the same, and the compatibility is low. Thus, in this case, it is necessary to perform control to switch the electrical length of the transmission line to 0 degree by the switching mechanism of the communication device on the responder side having the switching mechanism.

When the model type of the initiator and the model type of the responder are both the type C, the electrical lengths of the transmission lines are the same, and the compatibility is low; however, because the communication device of the type C does not have the switching mechanism, there is no way of switching.

[Process of Switching Transmission Line]

A process of switching a transmission line according to the embodiment is described hereinafter with reference to FIG. 14. Note that it is assumed that the following switching process is performed in the communication device on the initiator side or on the responder side.

The communication device on the responder side receives a connection request signal from the initiator and hardware information of the communication device on the initiator side before establishing a communication connection (step S1405). When the model type of the initiator is any of the type B and the type C, the electrical lengths of the transmission lines of the initiator and the responder are the same in the initial state, and the compatibility is low. When the model type of the initiator is the type B in step S1410, the electrical length of the transmission line of the communication device on the initiator side is switched to 0 degree, and then the process ends.

When the model type of the initiator is the type C in step S1410, a model type of the responder is determined (step S1410). When the model type of the responder is the type B, because the electrical lengths of the transmission lines of the initiator and the responder are the same, the electrical length of the transmission line of the communication device on the responder side is switched to 0 degree, and then the process ends. As a result, even when the compatibility is low in the initial state, the electrical length of the transmission line can be switched concurrently with or after the establishment of a communication connection, and then data transmission can be performed using a high-rate coding mode. When the model type of the initiator is determined to the type C in step S1410 and the model type of the responder is determined to the type C in step S1415, the process ends without performing the switching process because both of the communication devices do not have the switching mechanism.

As described above, according to the embodiment, even when both of communication devices have the same type of hardware configuration, the electrical lengths of the transmission lines of the two communication devices can be controlled to be different by switching the electrical length of the transmission line of either communication device. As a result, it is possible to suppress a ripple in transfer characteristics and prevent a decrease in data transmission speed and thereby provide good broadband characteristics.

Third Embodiment

In a close proximity wireless communication system according to a third embodiment of the disclosure, it is assumed that an RF unit of one communication device (initiator) is the type A, and an RF unit of the other communication device (responder) is the type B, both shown in FIG. 9. It is assumed that an initial value (default value) of a transmission line of each device type differs depending on device. A process of switching a transmission line in this case is described hereinbelow. Note that, in this embodiment, the following switching process is performed in the communication device on the initiator side or on the responder side, differently form the case according to the first embodiment. Further, the communication device on the responder side acquires a default value of a transmission line in addition to hardware information from the communication device on the initiator side.

[Process of Switching Transmission Line]

The communication device on the responder side acquires a connection request signal from the initiator and hardware information and a default value of a transmission line of the initiator before establishing a communication connection (step S1505). The communication device on the responder side determines the model type of the initiator based on the hardware information (step S1510). When the model type of the initiator is the type A, the model type of the responder is determined in step S1515, and, when the model type of the responder is the type A, the process ends because the switching process is not available.

When the model type of the responder is determined to the type B in step S1515, a difference between the electrical lengths of the transmission lines of the initiator and the responder is determined from the default value of the transmission line of the initiator (step S1520). When a difference between the electrical lengths of the transmission lines of the two communication devices is 90 degrees, the process ends because the switching control is not necessary. On the other hand, when a difference between the electrical lengths of the transmission lines of the two communication devices is 0 degree in step S1520, the electrical lengths of the transmission lines of the initiator and the responder are the same, and the compatibility is low. Thus, in step S1530, the electrical length of the transmission line of the responder which is capable of switching control is switched so that a difference between the electrical lengths of the transmission lines becomes 90 degrees, and then the process ends.

When the model type of the initiator is determined to the type B in step S1510, the model type of the responder is determined in step S1525. When the model type of the responder is the type B, because the initiator and the responder are of the same model type, the electrical lengths of the transmission lines are the same, and the compatibility is low. Thus, in step S1530, the electrical length of the transmission line of either responder or responder is switched, and then the process ends.

On the other hand, when the model type of the responder is the type A in step S1525, a difference between the electrical lengths of the transmission lines of the initiator and the responder is determined (step S1535). When a difference between the electrical lengths of the transmission lines is 90 degrees, the process ends because the switching control is not necessary. On the other hand, when a default value is 0 degree in step S1535, the electrical lengths of the transmission lines of the initiator and the responder are the same, and the compatibility is low. Thus, in step S1530, the electrical length of the transmission line of the initiator which is capable of switching control is switched so that a difference between the electrical lengths of the transmission lines becomes 90 degrees, and then the process ends.

As described above, according to the embodiment, even when the initiator and the responder are of the same model type and have the same electrical length of the transmission lines and therefore the compatibility is low, or, even when the initiator and the responder are of different model types but still have the same electrical length of the transmission lines depending on the initial state and therefore the compatibility is low, the electrical length of the transmission line is switched concurrently with or after the establishment of a communication connection. Consequently, the occurrence of a ripple can be suppressed, and data transmission can be performed using a high-rate coding mode.

As described in the foregoing, according to each of the above embodiments, even when the electrical lengths of transmission lines of two communication devices are equal, the electrical lengths of the transmission lines of the two communication devices can be controlled to be different by switching a transmission line of either communication device. It is thereby possible to suppress a ripple and prevent a decrease in data transmission speed and thereby provide good broadband characteristics.

The switching process according to each of the embodiments is performed mainly by a control unit. In practice, the switching function of the control unit is implemented by a CPU (not shown) that executes a program. The program for executing each processing described above is prestored in ROM or nonvolatile memory (both not shown), and the CPU reads and executes each program from such memory to thereby implement the switching function of the control unit.

In the first and second embodiments described above, the operations of the respective units are related to each other and may be replaced with a series of operations in consideration of the relation to each other. The embodiment of the communication device or the communication system can be thereby converted into the embodiment of a communication method of the communication device.

The preferred embodiments of the present disclosure have been described above with reference to the accompanying drawings, whilst the present disclosure is not limited to the above examples, of course. It should be understood by those skilled in the art that various modifications, combinations, sub-combinations and alterations may occur depending on design requirements and other factors insofar as they are within the scope of the appended claims or the equivalents thereof.

Further, although the control unit according to each of the above-described embodiments switches a transmission line so that a difference between the electrical length of a transmission line of a device at the other end of communication and the electrical length of the transmission line of its own device becomes 90 degrees, a difference in electrical length of a transmission line from a device at the other end of communication is not limited thereto. The control unit may switch a transmission line of either communication device so that an electrical length is different between a transmission line that connects a high frequency coupler and a band-pass filter of a device at the other end of communication and a transmission line that connects a high frequency coupler and a band-pass filter of its own device. Note that, however, as shown in FIG. 5, if a difference in electrical length of a transmission line from a device at the other end of communication is in the range of 90 degrees±40 degrees, a ripple is suppressed to about 1.0 dB, which is preferable. Further, if a difference in electrical length of a transmission line from a device at the other end of communication is in the range of 90 degrees±20 degrees, a ripple is suppressed to about 0.5 dB, which is more preferable.

The present disclosure contains subject matter related to that disclosed in Japanese Priority Patent Application JP 2010-157804 filed in the Japan Patent Office on Jul. 12, 2010, the entire content of which is hereby incorporated by reference.

What is claimed is:

1. A communication device comprising:
   a high frequency coupler;
   a band-pass filter;
   a switching mechanism that switches an electrical length of a transmission line between the high frequency coupler and the band-pass filter;
   a communication unit that receives hardware information of other end of communication before establishing a communication connection; and
   a control unit that controls switching of the electrical length of the transmission line according to the received hardware information of the other end of communication by using the switching mechanism with or after establishing a communication connection.

2. The communication device according to claim 1, wherein
   when a type of a device at the other end of communication determined based on the hardware information is same as a type of its own device, the control unit switches the transmission line so that an electrical length is different between a transmission line connecting a high frequency coupler and a band-pass filter of the device at the other end of communication and the transmission line connecting the high frequency coupler and the band-pass filter of its own device.

3. The communication device according to claim 2, wherein
   the control unit switches the transmission line so that a difference in electrical length between the transmission line of the device at the other end of communication and the transmission line of its own device is 90 degrees±40 degrees.

4. The communication device according to claim 3, wherein
   the control unit switches the transmission line so that a difference in electrical length between the transmission line of the device at the other end of communication and the transmission line of its own device is 90 degrees±20 degrees.

5. The communication device according to claim 1, wherein
   switching of the transmission line is performed on a device side having received a connection request signal before establishing a communication connection.

6. The communication device according to claim 1, wherein
   switching of the transmission line is performed on a device side having received a connection accept signal in response to a connection request signal.

7. The communication device according to claim 1, wherein
   after switching the transmission line with or after establishing a communication connection, the communication unit performs data transmission using a coding mode with a higher rate than before establishing a communication connection.

8. The communication device according to claim 1, wherein
   the communication unit performs data transmission with a device at the other end of communication located at a short distance by close proximity wireless communication.

9. The communication device according to claim 1, wherein
   the communication unit receives information related to an initial value of an electrical length of a transmission line of the other end of communication in addition to the hardware information of the other end of communication, and
   the control unit controls switching of the electrical length of the transmission line according to the received hardware information of the other end of communication and the received initial value of the electrical length of the transmission line of the other end of communication by using the switching mechanism with or after establishing a communication connection.

10. A communication system to perform data transmission between two communication devices each including a high frequency coupler and a band-pass filter, at least one communication device of the two communication devices comprising:
   a switching mechanism that switches an electrical length of a transmission line between the high frequency coupler and the band-pass filter;
   a communication unit that receives hardware information of other communication device before establishing a communication connection; and
   a control unit that controls switching of the electrical length of the transmission line according to the received hardware information of the other communication device by using the switching mechanism with or after establishing a communication connection.

11. A communication method of a communication device including a high frequency coupler and a band-pass filter, the method comprising:

receiving hardware information of other end of communication before establishing a communication connection; and controlling switching of an electrical length of a transmission line between the high frequency coupler and the band-pass filter according to the received hardware information of the other end of communication, by using a switching mechanism that switches the electrical length of the transmission line between the high frequency coupler and the band-pass filter, with or after establishing a communication connection.

* * * * *